(12) United States Patent
Fujiwara et al.

(10) Patent No.: US 8,941,260 B2
(45) Date of Patent: Jan. 27, 2015

(54) VEHICLE LIGHT CONTROL DEVICE

(71) Applicants: Hiroyuki Fujiwara, Aichi (JP);
Takahito Terayama, Aichi (JP)

(72) Inventors: Hiroyuki Fujiwara, Aichi (JP);
Takahito Terayama, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 8 days.

(21) Appl. No.: 13/938,393

(22) Filed: Jul. 10, 2013

(65) Prior Publication Data

US 2014/0015406 A1    Jan. 16, 2014

(30) Foreign Application Priority Data

Jul. 11, 2012   (JP) ................................ 2012-155485

(51) Int. Cl.
  *B60L 1/14* (2006.01)
  *B60Q 1/00* (2006.01)
  *B60Q 1/14* (2006.01)

(52) U.S. Cl.
  CPC ............ *B60Q 1/0023* (2013.01); *B60Q 1/1423* (2013.01); *B60Q 2300/337* (2013.01); *B60Q 2300/314* (2013.01)
  USPC ............ 307/10.8; 307/10.1; 315/77; 315/308

(58) Field of Classification Search
  USPC ............................. 307/10.1, 10.8; 315/77, 308
  See application file for complete search history.

(56) References Cited

U.S. PATENT DOCUMENTS

| | | | |
|---|---|---|---|
| 5,329,206 A * | 7/1994 | Slotkowski et al. | 315/159 |
| 7,639,149 B2 | 12/2009 | Katoh | |
| 8,600,656 B2 * | 12/2013 | Mimeault et al. | 701/301 |
| 2002/0163444 A1 * | 11/2002 | Budnovitch | 340/932.2 |
| 2007/0285019 A1 * | 12/2007 | Katoh | 315/82 |
| 2009/0284361 A1 * | 11/2009 | Boddie et al. | 340/439 |
| 2010/0309024 A1 * | 12/2010 | Mimeault | 340/932.2 |
| 2011/0012396 A1 * | 1/2011 | Laake | 297/188.14 |

FOREIGN PATENT DOCUMENTS

| | | | | |
|---|---|---|---|---|
| JP | 1044860 A | 2/1998 | | |
| JP | 10044860 A | * 2/1998 | ............... | B60Q 1/02 |
| JP | H10-90759 A | 4/1998 | | |
| JP | 2001163115 A | 6/2001 | | |
| JP | 2007302046 A | 11/2007 | | |
| JP | 2008080932 A | 4/2008 | | |

OTHER PUBLICATIONS

Japanese Office Action for Application No. 2012-155485, mailed on Jun. 24, 2014 (8 pages).

* cited by examiner

*Primary Examiner* — Thuy Vinh Tran
*Assistant Examiner* — Syed M Kaiser
(74) *Attorney, Agent, or Firm* — Osha Liang LLP

(57) ABSTRACT

A vehicle light control device mounted on a vehicle to control lighting of a light of the vehicle based on illuminance around the vehicle, has an infrared sensor that detects an infrared ray around the vehicle, an infrared illuminance detector that detects infrared illuminance from an output of the infrared sensor, a visible-light sensor that detects visible light around the vehicle, a visible-light illuminance detector that detects visible-light illuminance from an output of the visible-light sensor, a storage in which a first lighting threshold is stored, and a controller that controls the lighting of the light based on the infrared illuminance detected by the infrared illuminance detector, the visible-light illuminance detected by the visible-light illuminance detector, and the first lighting threshold stored in the storage.

3 Claims, 10 Drawing Sheets

VEHICLE LIGHT CONTROL DEVICE

BACKGROUND OF THE INVENTION

1. Technical Field

The present invention relates to a light control device mounted on a vehicle, particularly to a device that controls lighting of the light based on illuminance around the vehicle.

2. Related Art

Conventionally, there is well known automatic light control in which a sensor detects the illuminance around the vehicle to automatically turn on and off a headlight of the vehicle. For example, Japanese Unexamined Patent Publications Nos. 2008-80932, 2001-163115, and 2007-302046 disclose the automatic light control.

In Japanese Unexamined Patent Publication No. 2008-80932, an ultraviolet sensor, an infrared sensor, and a visible-light sensor are provided in order to surely distinguish artificial light and natural light from each other to precisely perform the light control. In Japanese Unexamined Patent Publication No. 2001-163115, whether surroundings of the vehicle become gloomy at dusk is determined based on a comparison result of the illuminance detected by an illuminance sensor and a threshold, and a time change of the illuminance. In Japanese Unexamined Patent Publication No. 2007-302046, an iris of a driver is detected by an eye camera to change a lighting threshold at twilight gloom.

The illuminance around the vehicle changes depending on time periods such as morning, daytime, evening, and night, and the illuminance also changes when the vehicle goes in dark places such as in a tunnel, under an elevated structure, and in a shadow of a building. Therefore, in the automatic light control, it is necessary to accurately detect the illuminance around the vehicle, which changes depending on the environment. Particularly, at the dusk in which the surroundings of the vehicle become gloomy, a risk of an accident generation increases when the lighting is delayed. Accordingly, from the viewpoint of accident prevention, it is necessary that the automatic light control be performed such that the light is turned on in precise timing.

SUMMARY

One or more embodiments of the present invention is able to turn on the light in precise timing at dusk by accurately detecting that the surroundings of the vehicle become the gloom in which the light needs to be turned on.

In accordance with one or more embodiments of the present invention, a vehicle light control device that is mounted on a vehicle to control lighting of a light of the vehicle based on illuminance around the vehicle, includes: an infrared sensor that detects an infrared ray around the vehicle; an infrared illuminance detector that detects infrared illuminance from an output of the infrared sensor; a visible-light sensor that detects visible light around the vehicle; a visible-light illuminance detector that detects visible-light illuminance from an output of the visible-light sensor; a storage in which a first lighting threshold is stored; and a controller that controls the lighting of the light based on the infrared illuminance detected by the infrared illuminance detector, the visible-light illuminance detected by the visible-light illuminance detector, and the first lighting threshold stored in the storage, wherein the controller calculates a illuminance difference between the infrared illuminance detected by the infrared illuminance detector and the visible-light illuminance detected by the visible-light illuminance detector, and the controller turns on the light when the illuminance difference is less than or equal to the first lighting threshold.

In accordance with one or more embodiments of the present invention, by paying attention to a characteristic that the dusk is smaller than the daytime in illuminance difference between the infrared illuminance and the visible-light illuminance, the illuminance difference is compared to the lighting threshold to control the lighting of the light. Therefore, the gloom in which the light needs to be turned on can rapidly and correctly be detected at the dusk, and the light can be turned on in early timing. As a result, the increase of the risk of the accident generation caused by the delay of the lighting can be prevented.

In the vehicle light control device according to one or more embodiments of the present invention, a second lighting threshold may be stored in the storage in addition to the first lighting threshold, and the controller may turn on the light, when the illuminance difference between the infrared illuminance and the visible light illuminance is less than or equal to the first lighting threshold, or when the infrared illuminance detected by the infrared illuminance detector is less than or equal to the second lighting threshold.

In the vehicle light control device according to one or more embodiments of the present invention, a third lighting threshold may be stored in the storage in addition to the first lighting threshold, and the controller may turn on the light, when the illuminance difference between the infrared illuminance and the visible light illuminance is less than or equal to the first lighting threshold, or when the visible-light illuminance detected by the visible-light illuminance detector is less than or equal to the third lighting threshold.

According to one or more embodiments of the present invention, at the dusk, the light can be turned on in precise timing by accurately detecting that the surroundings of the vehicle become the gloom in which the light needs to be turned on.

DETAILED DESCRIPTION

Figure 1:
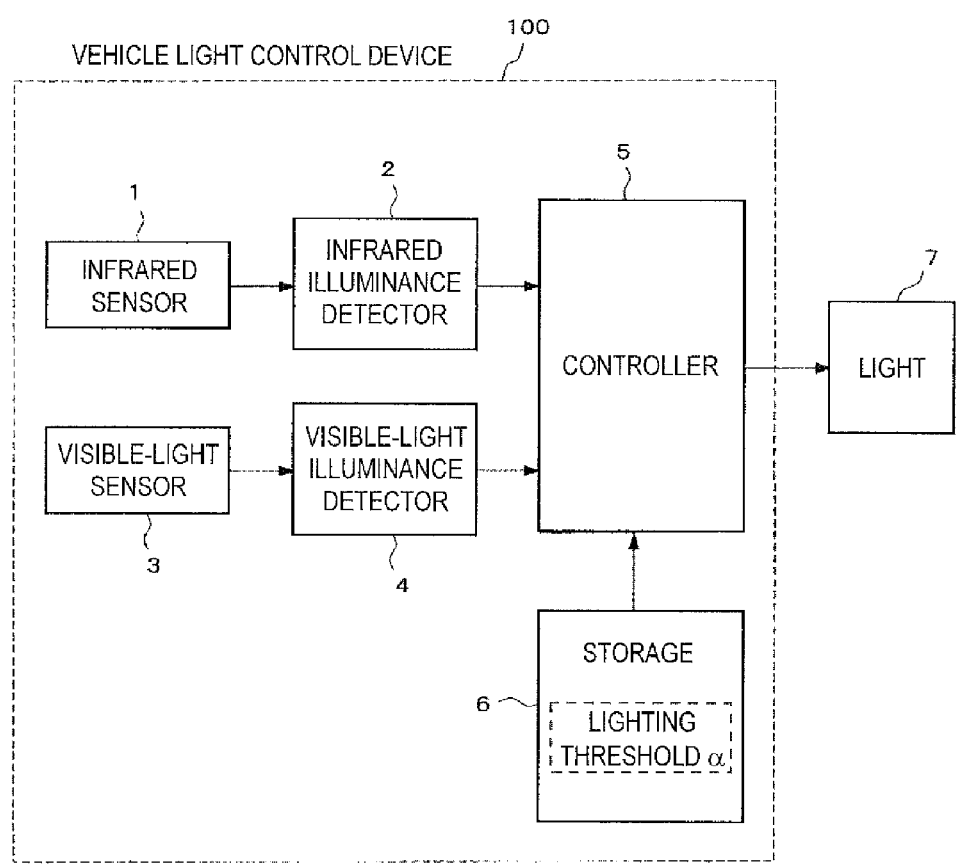
FIG. 1 is a block diagram illustrating a vehicle light control device according to a first embodiment of the present invention.

Embodiments of the present invention will be described below with reference to the drawings. In the drawings, the identical or equivalent component is designated by the identical numeral. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 is a block diagram illustrating a vehicle light control device (hereinafter simply referred to as a "light control device") according to a first embodiment.

A light control device 100 includes an infrared sensor 1, an infrared illuminance detector 2, a visible-light sensor 3, a visible-light illuminance detector 4, a controller 5, and a storage 6. For example, the infrared sensor 1 is provided in a dashboard in a vehicle to detect an infrared ray around the vehicle. The infrared illuminance detector 2 detects infrared illuminance from an output of the infrared sensor 1. For example, the visible-light sensor 3 is provided in the dashboard in the vehicle to detect visible light around the vehicle.

The visible-light illuminance detector 4 detects visible-light illuminance from the output of the visible-light sensor 3.

A lighting threshold $\alpha$ (a first lighting threshold) is stored in the storage 6. The controller 5 controls lighting of a light 7 based on the infrared illuminance detected by the infrared illuminance detector 2, the visible-light illuminance detected by the visible-light illuminance detector 4, and the lighting threshold $\alpha$ stored in the storage 6.

The controller 5 includes a CPU (Central Processing Unit) and a driving circuit for the light 7. A control program (not illustrated) necessary for an operation of the CPU is stored in the storage 6. The light 7 includes vehicle exterior lights such as a headlight and an auxiliary light.

A principle that detects the dusk with the light control device 100 having the above configuration will be described with reference to FIGS. 2 and 3.

Figure 2:
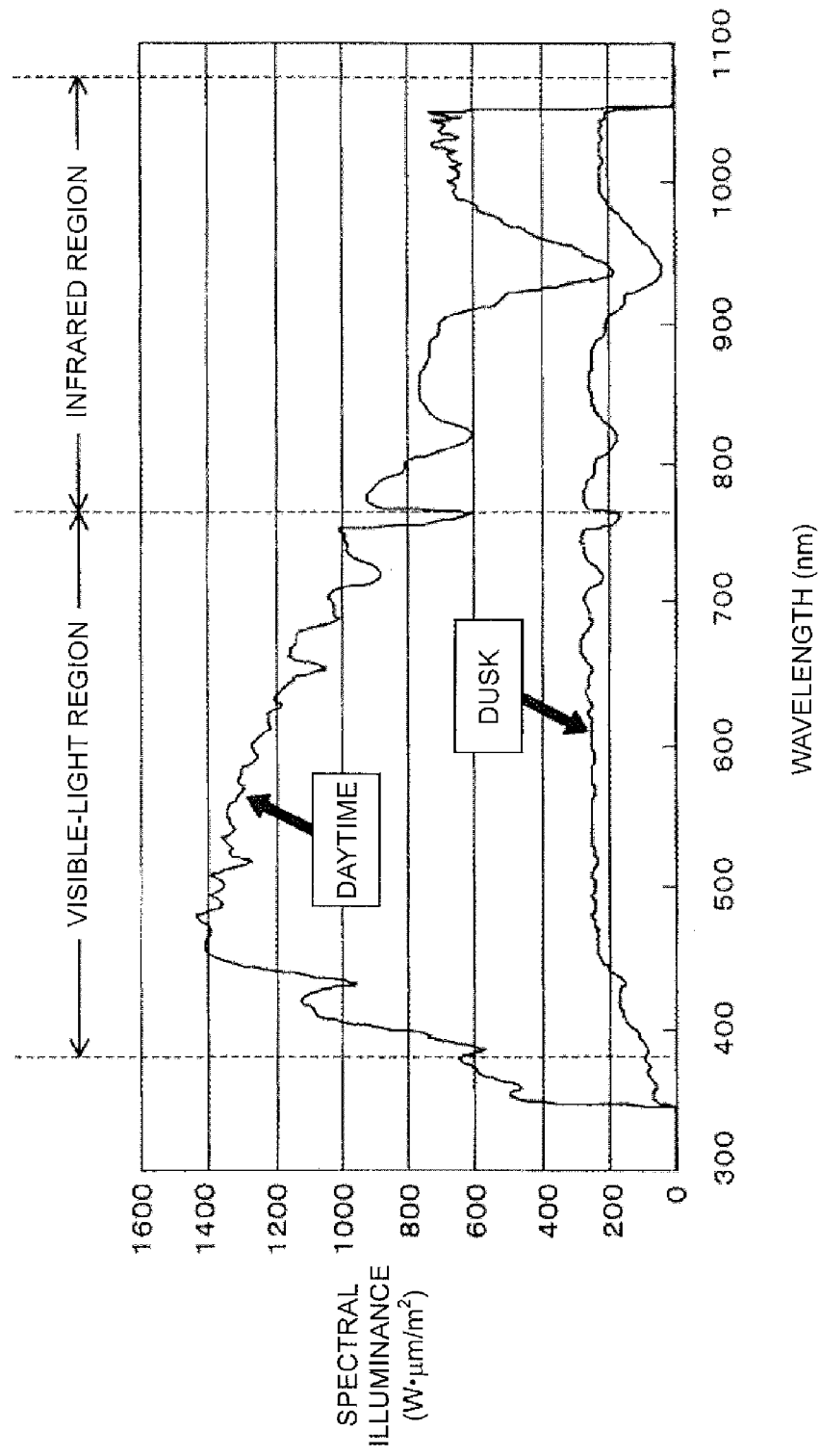
FIG. 2 is a view illustrating a difference in illuminance between an infrared ray and visible light at daytime and dusk.

FIG. 2 illustrates spectral illuminance at daytime and dusk with respect to the visible light and the infrared ray. As can be seen from FIG. 2, the visible-light illuminance tends to be larger than the infrared illuminance at the daytime, and there is no significant difference between the infrared illuminance and the visible-light illuminance at the dusk. That is, the dusk is smaller than the daytime in difference between the infrared illuminance and the visible-light illuminance. Therefore, the illuminance difference between the infrared illuminance and the visible-light illuminance has a time change in FIG. 3 from the daytime to the dusk.

Figure 3:
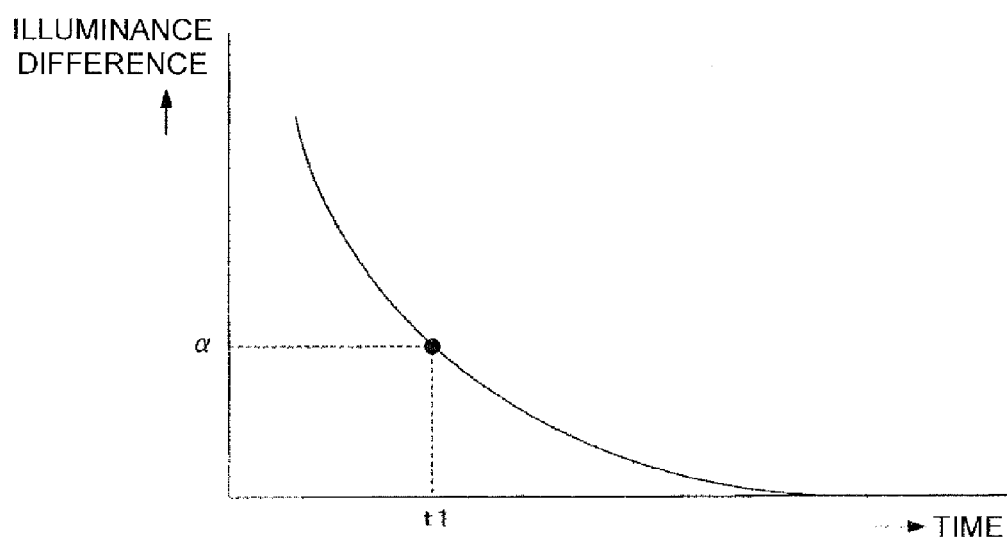
FIG. 3 is a view illustrating a principle of light control of the first embodiment.

In the first embodiment, the light 7 is turned on at a clock time t1 when the illuminance difference in FIG. 3 becomes the lighting threshold $\alpha$ or less. The lighting threshold $\alpha$ is set to the illuminance difference between the infrared illuminance and the visible-light illuminance when the surroundings of the vehicle become gloom in which the light needs to be lit. Therefore, the light 7 can surely be turned on at the time when the lighting is required.

Figure 4:
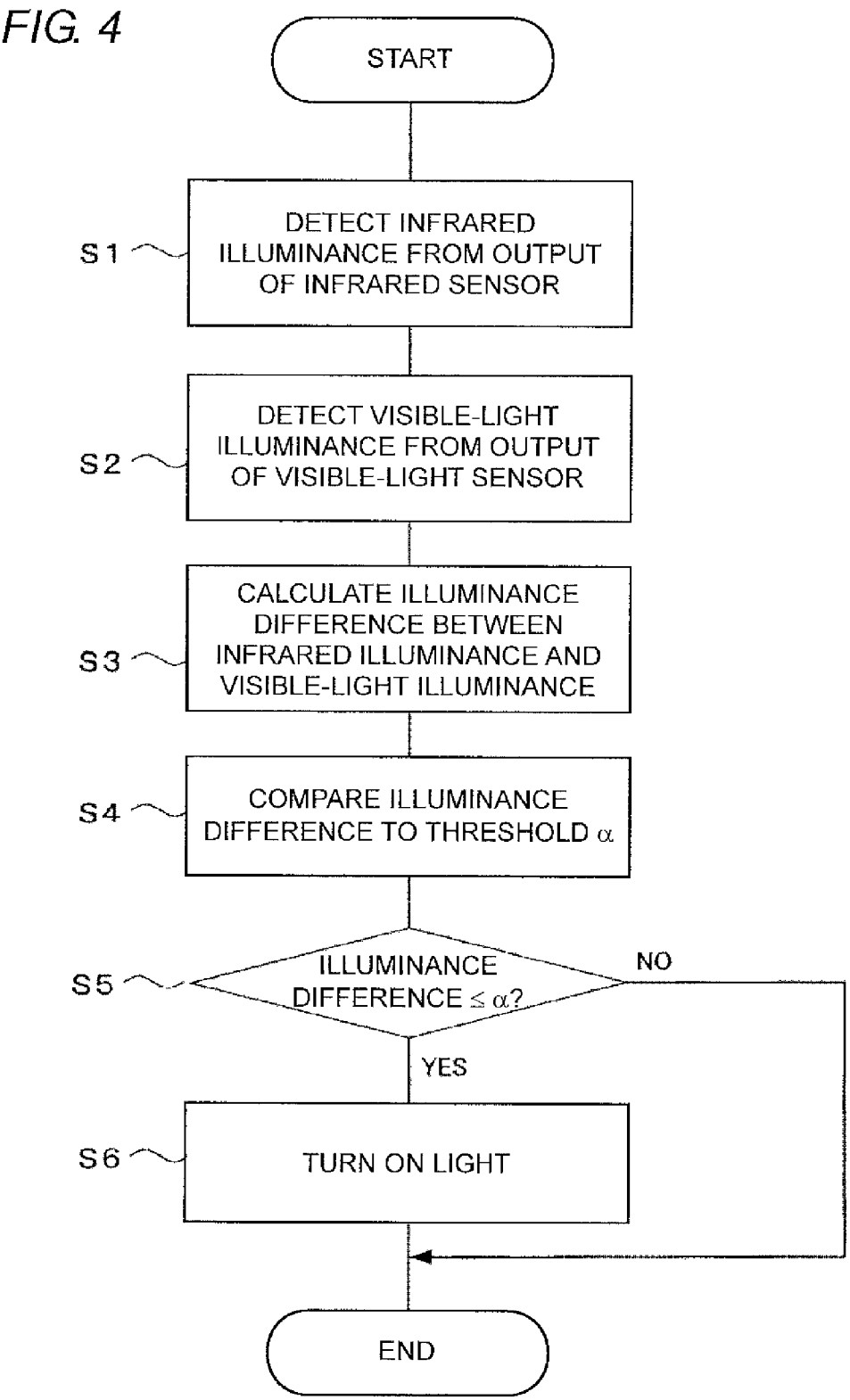
FIG. 4 is a flowchart illustrating a procedure of the light control of the first embodiment.

A series of steps of the light control based on the principle will be described with reference to a flowchart in FIG. 4.

In Step S1, the infrared illuminance detector 2 detects the infrared illuminance from the output of the infrared sensor 1. In Step S2, the visible-light illuminance detector 4 detects the visible-light illuminance from the output of the visible-light sensor 3. The orders of Steps S1 and S2 may be replaced for each other. Pieces of processing in Steps S1 and S2 may concurrently be performed.

In Step S3, the controller 5 calculates a difference between the infrared illuminance detected in Step S1 and the visible-light illuminance detected in Step S2, namely, the illuminance difference. In this case, an average value of the illuminance over a whole wavelength range in an infrared region in FIG. 2 or an average value of the illuminance at a specific wavelength may be used as a value of the infrared illuminance. Similarly, an average value of the illuminance over a whole wavelength range in a visible-light region in FIG. 2 or an average value of the illuminance at a specific wavelength may be used as a value of the visible-light illuminance. The same holds true for second and third embodiments described below.

In Step S4, the controller 5 compares the illuminance difference calculated in Step S3 to the lighting threshold $\alpha$. In Step S5, as a result of the comparison in Step S4, the controller 5 determines whether the illuminance difference between the infrared illuminance and the visible-light illuminance is less than or equal to the lighting threshold $\alpha$. When the illuminance difference is greater than the lighting threshold $\alpha$ (NO in Step S5), a determination that the lighting of the light 7 is not required is made to end the processing.

On the other hand, as a result of the determination, when the illuminance difference is less than or equal to the lighting threshold $\alpha$ (YES in Step S5), the flow proceeds to Step S6. In Step S6, the controller 5 determines that the surroundings of the vehicle becomes the gloom in which the light needs to be lit, and turns on the light 7. In this case, all the vehicle exterior lights may be lit, or only the necessary vehicle exterior light may be lit. For example, only the headlight may be lit, or only the auxiliary light may be lit. Alternatively, both the headlight and the auxiliary light may be lit.

As described above, in the first embodiment, by paying attention to the characteristic that the dusk is smaller than the daytime in difference between the infrared illuminance and the visible-light illuminance, the illuminance difference is compared to the lighting threshold $\alpha$ to control the lighting of the light 7. When the infrared illuminance is compared to the lighting threshold to control the lighting using only the infrared sensor, the lighting is delayed at the dusk, because the sun irradiate a substantial amount of infrared ray even at the dusk until the sun sinks completely.

Therefore, in the first embodiment, both the infrared sensor 1 and the visible-light sensor 3 are used, and the infrared illuminance and the visible-light illuminance are used, so that the gloom in which the light needs to be turned on can rapidly and correctly be detected at the dusk. As a result, the light 7 can be turned on in early timing to prevent the increase of the risk of the accident generation caused by the delay of the lighting.

Figure 5:
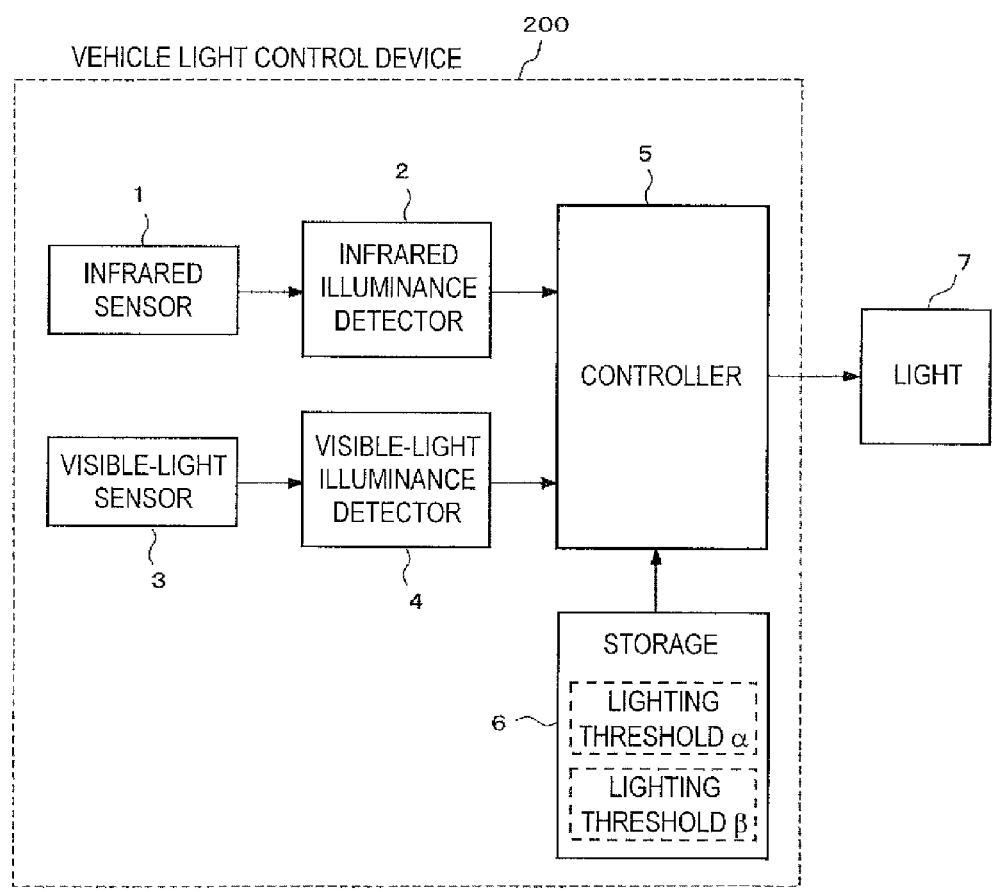
FIG. 5 is a block diagram illustrating a vehicle light control device according to a second embodiment of the present invention.

A second embodiment of the present invention will be described below. FIG. 5 is a block diagram illustrating a vehicle light control device 200 of the second embodiment. Referring to FIG. 5, in addition to the lighting threshold $\alpha$ (the first lighting threshold), a lighting threshold $\beta$ (a second lighting threshold) is stored in the storage 6. Because other configurations are identical to those in FIG. 1, the description is omitted.

The lighting threshold $\beta$ is set to the value of the infrared illuminance, at which the surroundings become the darkness in which the light needs to be turned on when the vehicle goes in the tunnel. In the tunnel, the infrared ray included in the sunlight is cut off even at the daytime, and usually a light source emitting the infrared ray does not exist.

Figure 6:
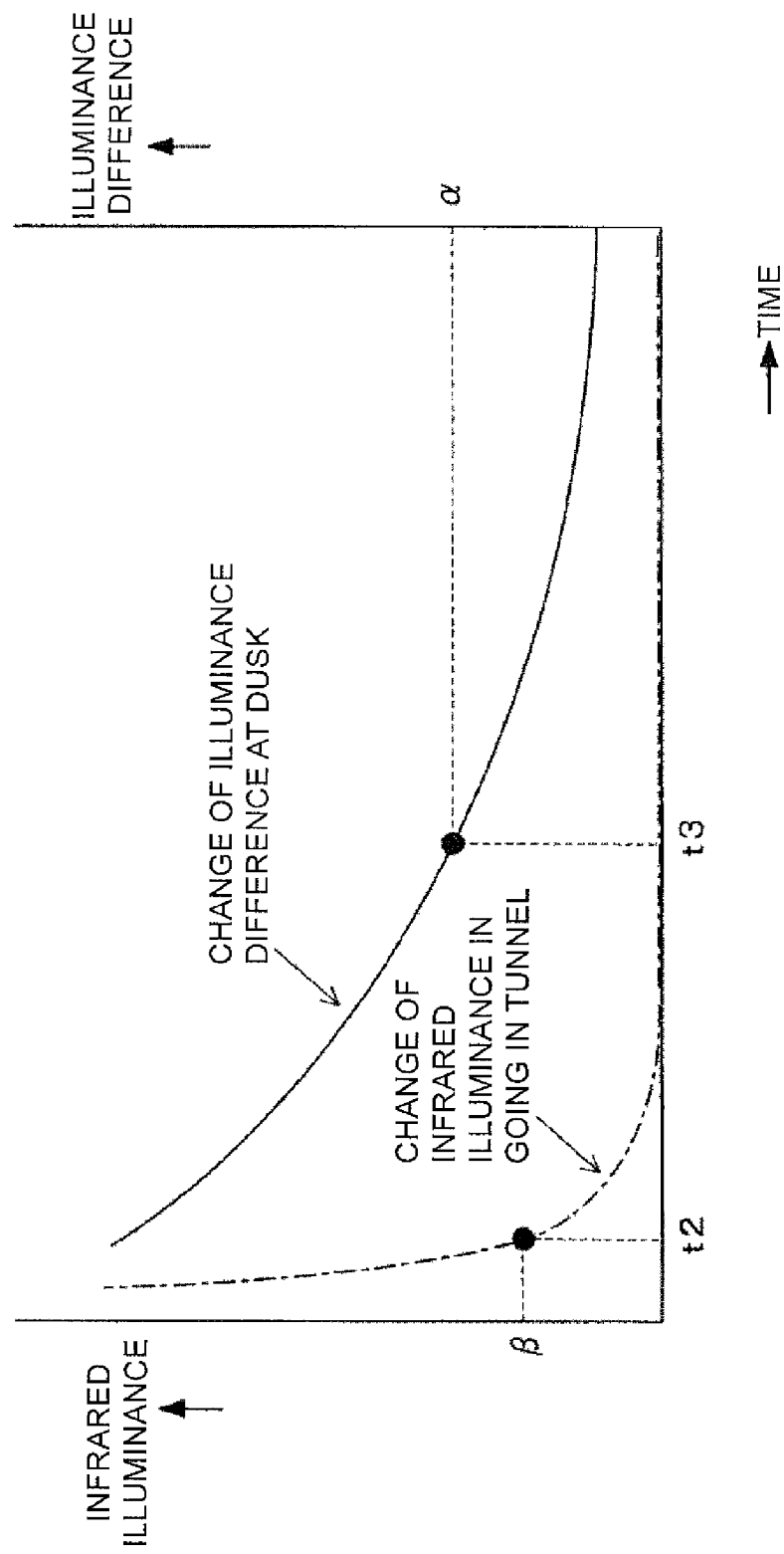
FIG. 6 is a view illustrating a principle of the light control of the second embodiment.

When the vehicle goes in the tunnel, the infrared illuminance decreases rapidly as illustrated by an alternate long and short dash line in FIG. 6. Therefore, in FIG. 6, the light 7 is turned on at a clock time t2 when the infrared illuminance becomes the lighting threshold β or less. Accordingly, the light 7 can surely be turned on at the time when the vehicle goes in the tunnel.

On the other hand, the lighting at the dusk is identical to that of the first embodiment. That is, in FIG. 6, the light 7 is turned on at a clock time t3 when the illuminance difference between the infrared illuminance and the visible-light illuminance becomes the lighting threshold α or less. Therefore, at the dusk, the light 7 can surely be turned on in the precise timing.

Figure 7:
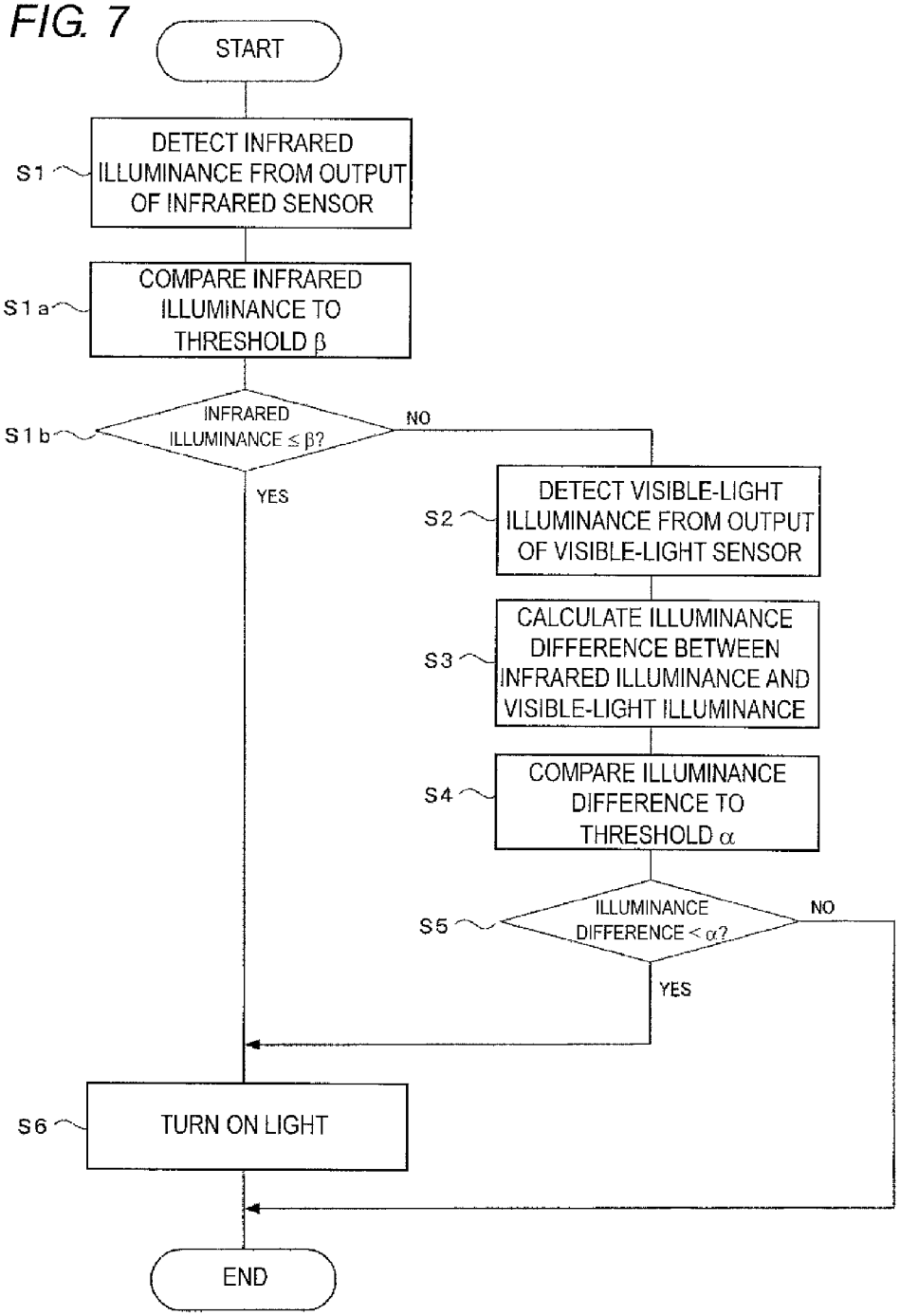
FIG. 7 is a flowchart illustrating a procedure of the light control of the second embodiment.

A series of steps of the light control of the second embodiment will be described with reference to a flowchart in FIG. 7. In FIG. 7, the processing in the step identical to that in FIG. 4 is designated by the identical numeral.

In Step S1, the infrared illuminance detector 2 detects the infrared illuminance from the output of the infrared sensor 1. In Step S1a, the controller 5 compares the infrared illuminance detected in Step S1 to the lighting threshold β. In Step S1b, as a result of the comparison in Step S1a, the controller 5 determines whether the infrared illuminance is less than or equal to the lighting threshold β. When the infrared illuminance is less than or equal to the lighting threshold (YES in Step S1b), the determination that the vehicle goes in the tunnel is made, and the flow goes to Step S6. In Step S6, the controller 5 turns on the light 7.

On the other hand, as a result of the determination in step Sib, when the infrared illuminance is greater than the lighting threshold β (NO in Step S1b), the flow goes to Step S2. The pieces of processing in Steps S2 to S5 are identical to those in FIG. 4. That is, the visible-light illuminance is detected in Step S2, the illuminance difference is calculated in Step S3, and the illuminance difference is compared to the lighting threshold α in Step S4. The processing is ended when the illuminance difference is greater than the lighting threshold α (NO in Step S5). When the illuminance difference is less than or equal to the lighting threshold α (YES in Step S5), the determination that the surroundings of the vehicle become gloomy at the dusk is made, and the light 7 is turned on in Step S6.

As described above, in the second embodiment, the infrared sensor 1 is used in the automatic light control at both the dusk and the time when the vehicle goes in the tunnel. Therefore, the light 7 can be turned on in the precise timing in both the cases without adding a new sensor.

Figure 8:
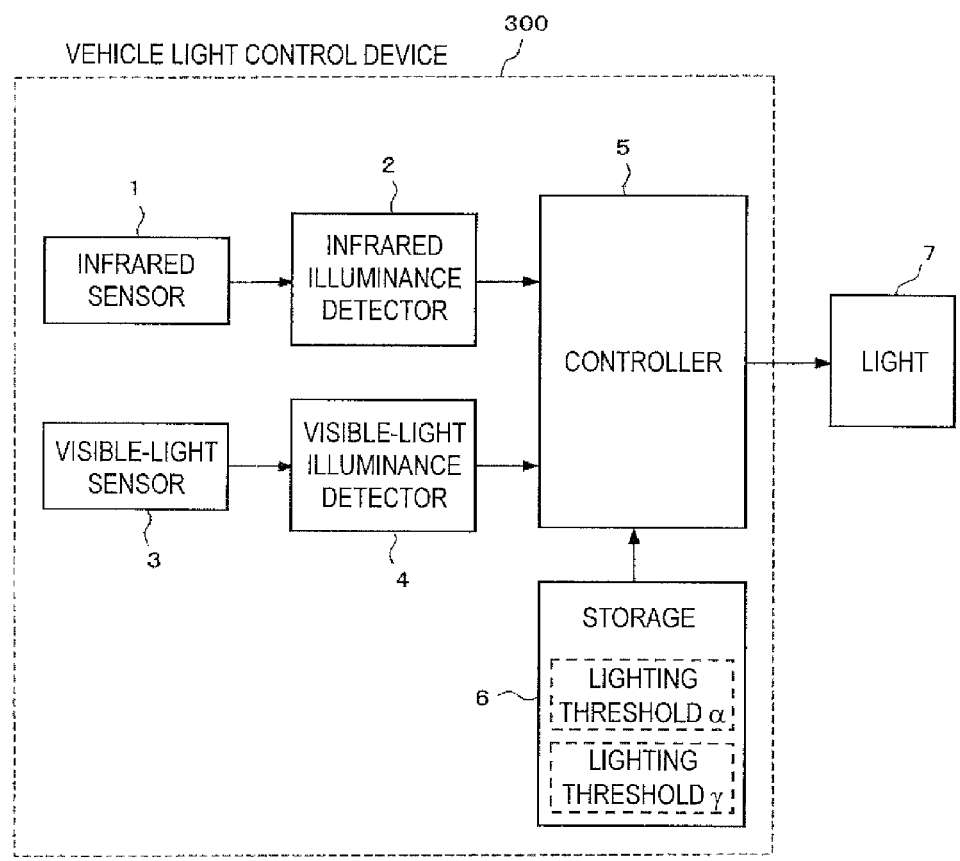
FIG. 8 is a block diagram illustrating a vehicle light control device according to a third embodiment of the present invention.

A third embodiment of the present invention will be described below. FIG. 8 is a block diagram illustrating a vehicle light control device 300 of the third embodiment. Referring to FIG. 8, in addition to the lighting threshold α (the first lighting threshold), a lighting threshold γ (a third lighting threshold) is stored in the storage 6. Because other configurations are identical to those in FIG. 1, the description is omitted.

The lighting threshold γ is set to the value of the visible-light illuminance, at which the surroundings become the darkness in which the light needs to be turned on when the vehicle goes in the tunnel. Because usually a light source emitting the visible light exists in the tunnel, sometimes a precise determination whether the light needs to be turned on is hardly made from the change in visible-light illuminance. However, whether the light needs to be turned on can be determined from the change in visible-light illuminance when the visible light source does not exist in the tunnel (for example, a short tunnel), or when the illuminance is low in the tunnel even if the visible light source exists. The third embodiment is suitable for these cases.

Figure 9:
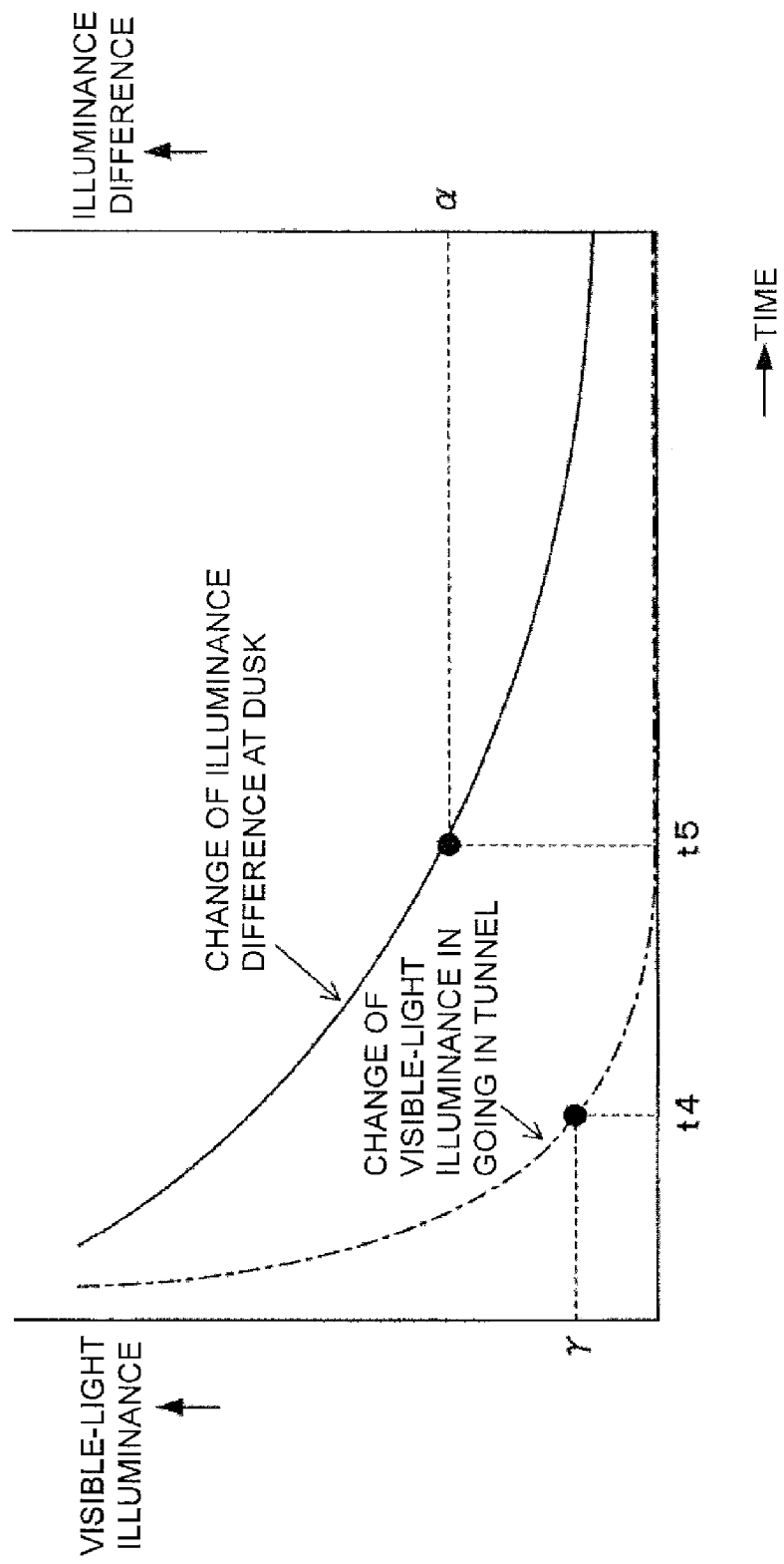
FIG. 9 is a view illustrating a principle of the light control of the third embodiment.

When the vehicle goes in the tunnel, the visible-light illuminance decreases rapidly as illustrated by the alternate long and short dash line in FIG. 9, in the case where the visible light source does not exist in the tunnel, or in the case where the illuminance is low even if the visible light source exists in the tunnel. Therefore, in FIG. 9, the light 7 is turned on at a clock time t4 when the visible-light illuminance becomes the lighting threshold γ or less. Accordingly, the light 7 can surely be turned on at the time when the vehicle goes in the tunnel.

On the other hand, the lighting at the dusk is identical to that of the first embodiment. That is, in FIG. 9, the light 7 is turned on at a clock time t5 when the illuminance difference between the infrared illuminance and the visible-light illuminance becomes the lighting threshold α or less. Therefore, at the dusk, the light 7 can surely be turned on in the precise timing.

Figure 10:
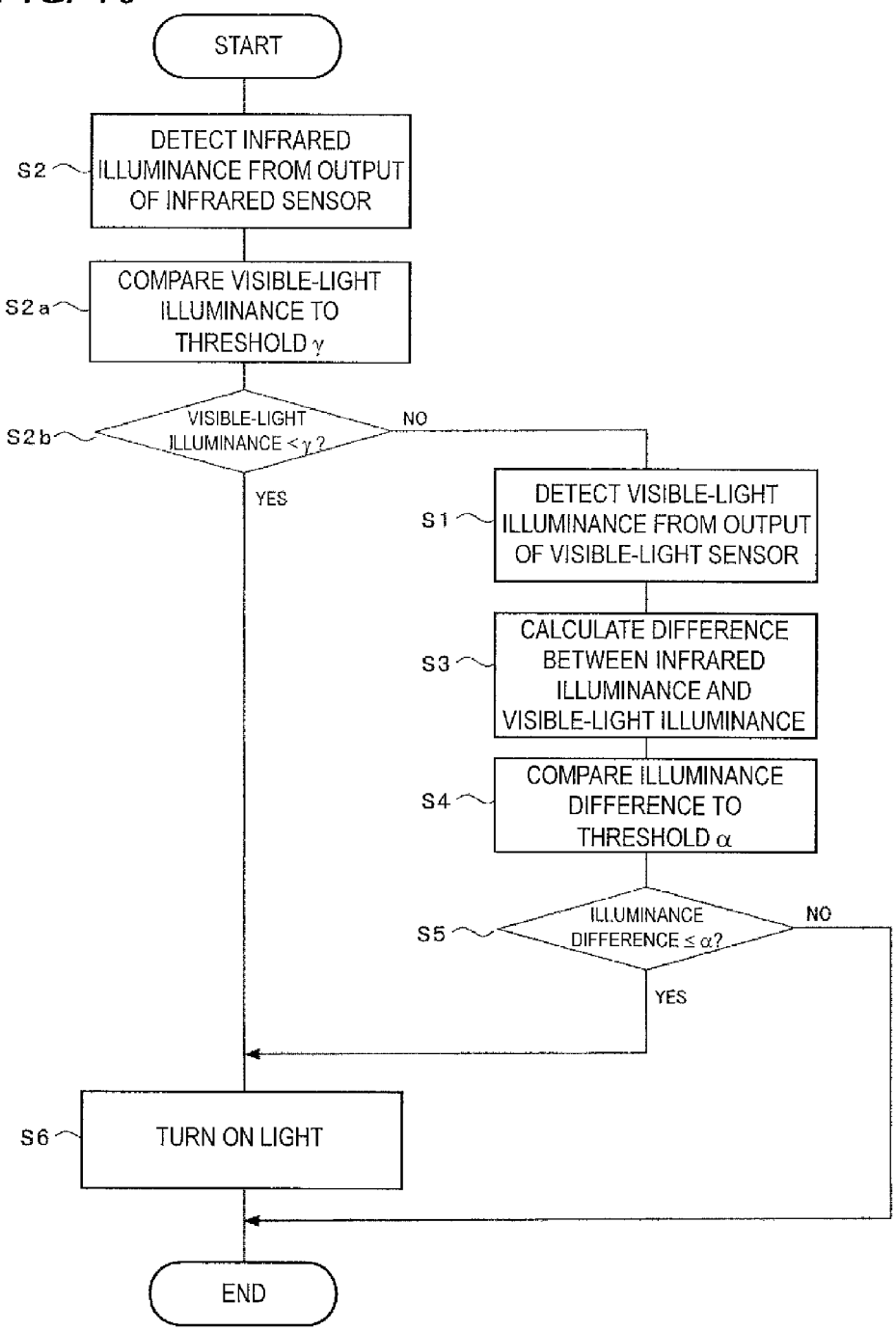
FIG. 10 is a flowchart illustrating a procedure of the light control of the third embodiment.

A series of steps of the light control of the third embodiment will be described with reference to a flowchart in FIG. 10. In FIG. 10, the processing in the step identical to that in FIG. 4 is designated by the identical numeral.

In FIG. 10, the processing in Step S2 is initially performed. In Step S2, the visible-light illuminance detector 4 detects the visible-light illuminance from the output of the visible-light sensor 3. In Step S2a, the controller 5 compares the visible-light illuminance detected in Step S2 to the lighting threshold γ. In Step S2b, as a result of the comparison in Step S2a, the controller 5 determines whether the visible-light illuminance is less than or equal to the lighting threshold γ. As a result of the determination, when the visible-light illuminance is less than or equal to the lighting threshold γ (YES in Step S2b), the determination that the vehicle goes in the tunnel is made, and the flow proceeds to Step S6. In Step S6, the controller 5 turns on the light 7.

On the other hand, as a result of the determination in Step S2b, when the visible-light illuminance is greater than the threshold γ (NO in Step S2b), the flow proceeds to Step S1. The pieces of processing in Steps S1 and S3 to S5 are identical to those in FIG. 4. That is, the infrared illuminance is detected in Step S1, the illuminance difference is calculated in Step S3, and the illuminance difference is compared to the lighting threshold α in Step S4. The processing is ended when the illuminance difference is greater than the lighting threshold α (NO in Step S5). When the illuminance difference is less than or equal to the lighting threshold α (YES in Step S5), the determination that the surroundings of the vehicle become gloomy at the dusk is made, and the light 7 is turned on in Step S6.

As described above, in the third embodiment, the visible-light sensor 3 is used in the automatic light control at both the dusk and the time when the vehicle goes in the tunnel. Therefore, the light 7 can be turned on in the precise timing in both the cases without adding a new sensor.

The present invention is not limited to the above embodiments. For example, in one or more of the above embodiments, the infrared sensor 1 and the visible-light sensor 3 are provided in the dashboard in the vehicle by way of example. Alternatively, the infrared sensor 1 and the visible-light sensor 3 may be provided anywhere in the vehicle as long as the illuminance around the vehicle can be detected. Accordingly, for example, the infrared sensor 1 and the visible-light sensor 3 may be provided on a roof of the vehicle.

In one or more of the above embodiments, the light control in the case where the vehicle goes in the tunnel is described by way of example. Alternatively, one or more embodiments of the present invention can also be applied to the light control in the case where the vehicle goes in the dark places such as under the elevated structure and in the shadow of the building.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle light control device mounted on a vehicle to control lighting of a light of the vehicle based on illuminance around the vehicle, comprising:
    an infrared sensor that detects an infrared ray around the vehicle;
    an infrared illuminance detector that detects infrared illuminance from an output of the infrared sensor;
    a visible-light sensor that detects visible light around the vehicle;
    a visible-light illuminance detector that detects visible-light illuminance from an output of the visible-light sensor;
    a storage in which a first lighting threshold is stored; and
    a controller that controls the lighting of the light based on the infrared illuminance detected by the infrared illuminance detector, the visible-light illuminance detected by the visible-light illuminance detector, and the first lighting threshold stored in the storage,
    wherein the controller calculates a illuminance difference between the infrared illuminance detected by the infrared illuminance detector and the visible-light illuminance detected by the visible-light illuminance detector, and the controller turns on the light when the illuminance difference is less than or equal to the first lighting threshold.

2. The vehicle light control device according to claim 1, wherein a second lighting threshold is stored in the storage in addition to the first lighting threshold, and
    wherein the controller turns on the light, when the illuminance difference is less than or equal to the first lighting threshold, or when the infrared illuminance detected by the infrared illuminance detector is less than or equal to the second lighting threshold.

3. The vehicle light control device according to claim 1, wherein a third lighting threshold is stored in the storage in addition to the first lighting threshold, and
    wherein the controller turns on the light, when the illuminance difference is less than or equal to the first lighting threshold, or when the visible-light illuminance detected by the visible-light illuminance detector is less than or equal to the third lighting threshold.

* * * * *